United States Patent [19]

Ono

[11] 4,378,142

[45] Mar. 29, 1983

[54] HOLOGRAM MADE BY USING A PLURALITY OF SPHERICAL WAVES AND A DEVICE FOR LASER BEAM SCANNING BY USING THE HOLOGRAM

[75] Inventor: Yuzo Ono, Tokyo, Japan

[73] Assignee: Nippon Electric Co., Ltd, Tokyo, Japan

[21] Appl. No.: 161,970

[22] Filed: Jun. 23, 1980

[30] Foreign Application Priority Data

Jun. 21, 1979 [JP] Japan ............................ 54-78495
Sep. 25, 1979 [JP] Japan ............................ 54-122865

[51] Int. Cl.$^3$ ........................ G02B 27/17; G03H 1/04
[52] U.S. Cl. .................................... 350/3.71; 350/3.6; 350/320
[58] Field of Search ............... 350/3.67, 3.71, 3.69, 350/3.73, 3.70, 3.68, 320, 3.6

[56] References Cited

U.S. PATENT DOCUMENTS

| | | | |
|---|---|---|---|
| 3,633,989 | 1/1972 | Benton | 350/3.69 |
| 3,647,289 | 3/1972 | Weber | 350/3.69 |
| 3,838,903 | 10/1974 | Leith et al. | 350/3.69 |

FOREIGN PATENT DOCUMENTS

55-38530 3/1980 Japan ............................ 350/3.71

OTHER PUBLICATIONS

Pennington, K. S. "How to Make Laser Holograms," Microwaves, Oct. 1965, pp. 35–40.

*Primary Examiner*—Bruce Y. Arnold
*Attorney, Agent, or Firm*—Sughrue, Mion, Zinn, Macpeak and Seas

[57] ABSTRACT

A hologram is manufactured by making a plurality of coherent spherical-wave beams, N ($\geq 3$) in number, interfere with one after another to provide a multiplicity of interference fringe configurations. A phase subtract aspheric-wave is produced by an auxiliary hologram manufactured by the use of two of the spherical-waves. The aspheric-wave is made to interfere with a third spherical-wave or a similar aspheric-wave. Phase distribution $\phi_N$ on the interference fringes is defined by:

$$\phi_N = 2\pi \left[ \sum_{k=1}^{N} ([r^2 + f_k^2]^{\frac{1}{2}} - f_k) \right] / \lambda$$

where r represents a distance on the hologram between a predetermined point and an optional point, $f_k$ is the distance between the principal surface and the point of convergence or divergence of the particular wave and $$\sum_{k=1}^{N} 1/f_k$$

is the focal power of the hologram for a coherent beam of the common wavelength. In a laser beam scanner, a coherent beam of a longer wavelength is preferably used in illuminating a hologram, which may or may not be a hologram manufactured as above.

12 Claims, 18 Drawing Figures

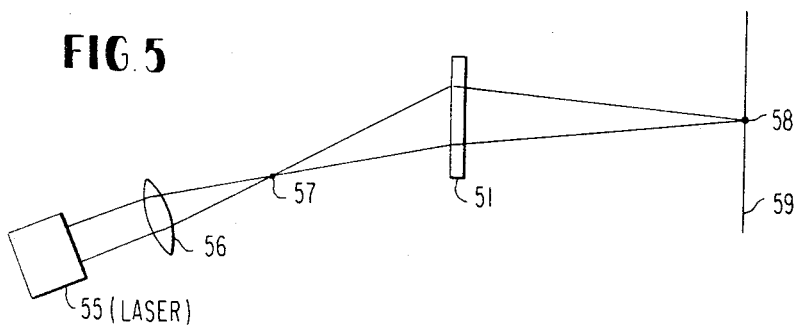
FIG. 5
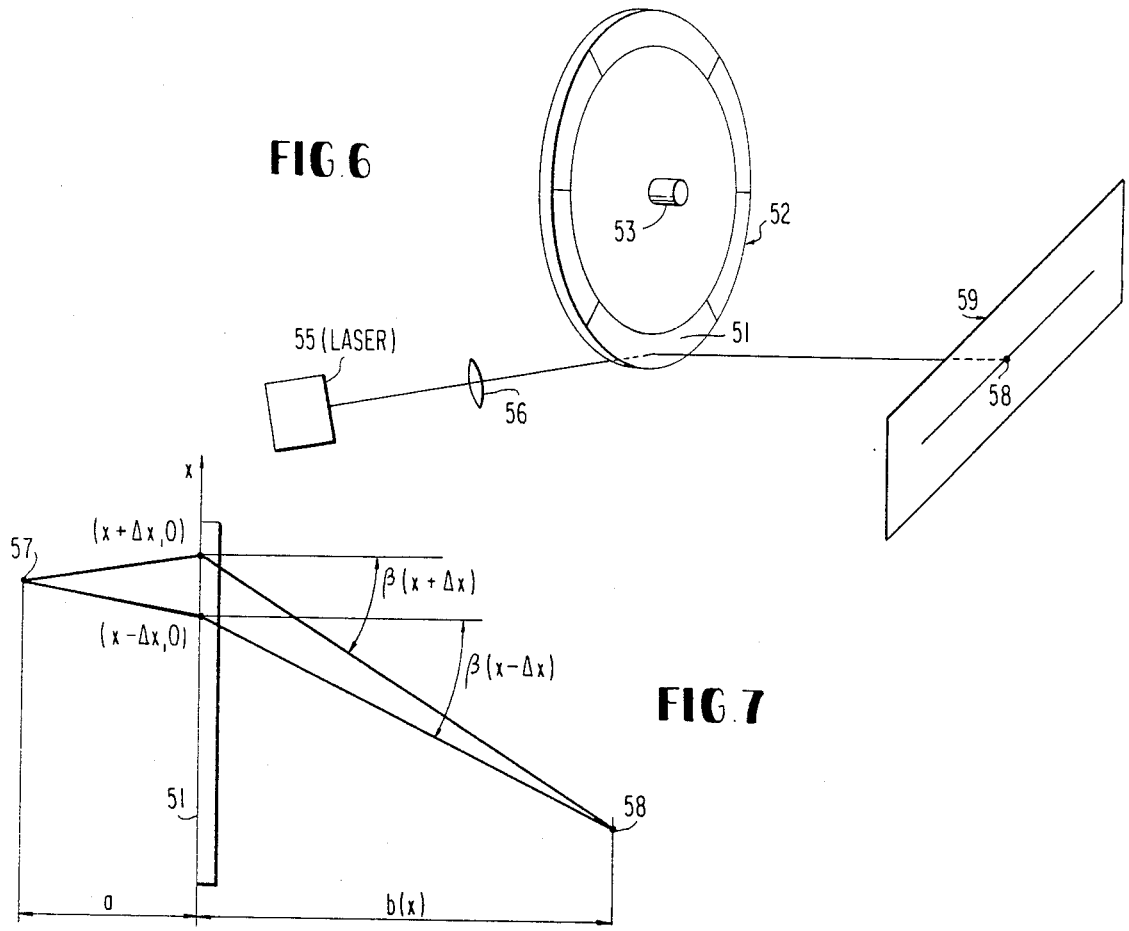
FIG. 6
FIG. 7
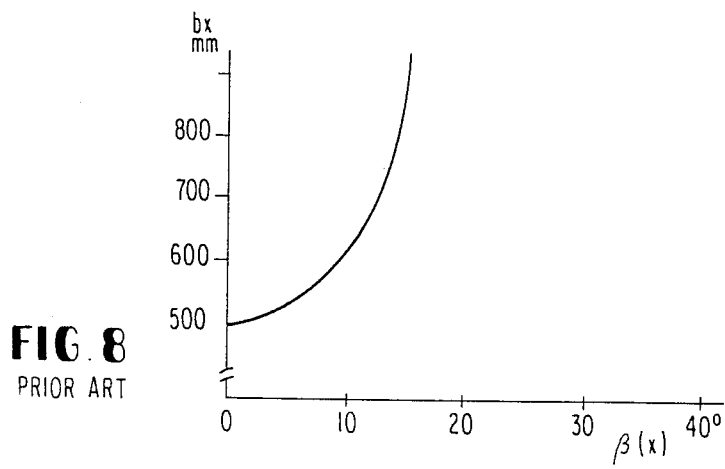
FIG. 8
PRIOR ART

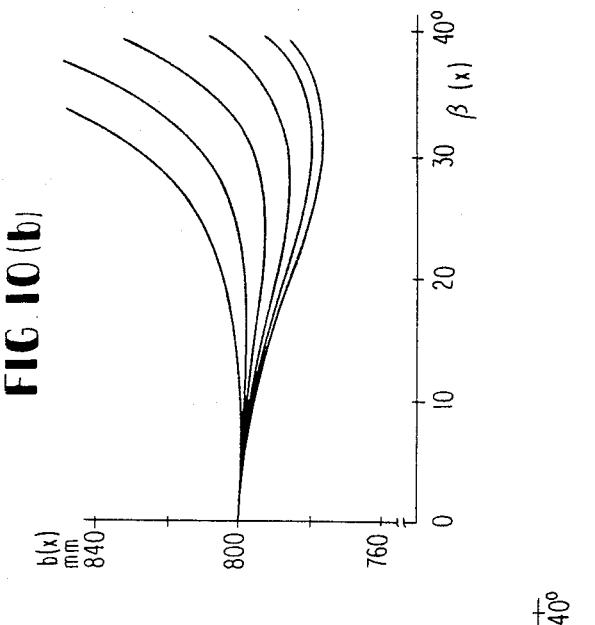
FIG.9(a)_PRIOR ART
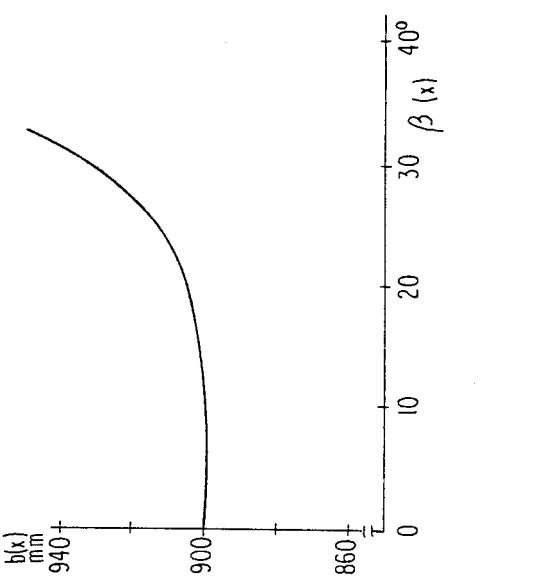
FIG.9(c)_PRIOR ART
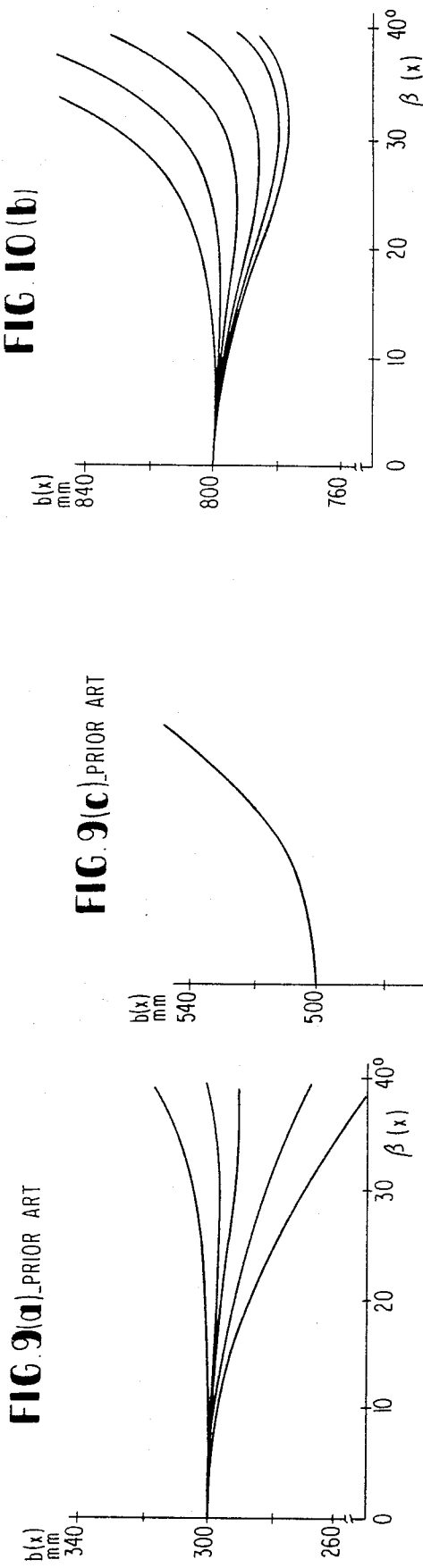
FIG.10(b)
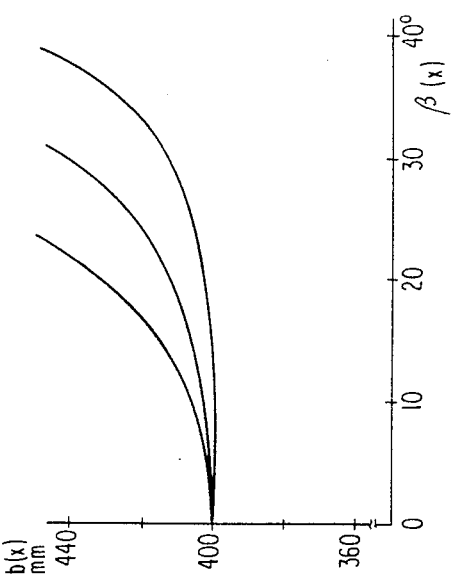
FIG.9(b)_PRIOR ART
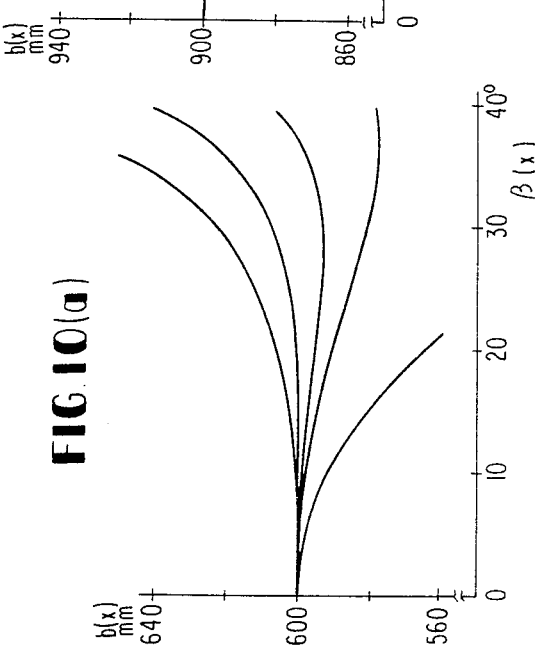
FIG.10(a)
FIG.10(c)

HOLOGRAM MADE BY USING A PLURALITY OF SPHERICAL WAVES AND A DEVICE FOR LASER BEAM SCANNING BY USING THE HOLOGRAM

BACKGROUND OF THE INVENTION

This invention relates to a hologram, a method of manufacturing a hologram, and a coherent beam scanner.

A hologram is more specifically called a holographic zone plate. The hologram is for use in, among others, a coherent beam scanner. A hologram has a constant that corresponds to the focal length of a thin lens and is also named a focal length F. As is the case with a thin lens, the focal length F is dependent on the wavelength of a coherent beam incident on the hologram.

A laser beam is usually used in a coherent beam scanner as a coherent beam. The coherent beam scanner is therefore referred to often as a laser beam scanner and will be so named in the following. As will later be described more in detail with reference to a few of a multiplicity of figures of the accompanying drawing, a hologram is used in a laser beam scanner as a diffraction grating for diffracting a laser beam illuminating a limited area of the hologram along an axis of illumination. The hologram produces a diffracted laser beam. The angle of diffraction varies when the hologram is linearly moved relative to the axis of illumination. The diffracted beam therefore scans a plane, herein called an output plane, as a small light spot or scan spot along a straight line. The length of the line is dependent on the maximum angle of deflection of the diffracted beam relative to the axis of illumination and on the ratio of the distance between the hologram and the output plane to the focal length F of the hologram for the illuminating beam. The ratio will herein be referred to as a factor of magnification M.

Inasmuch as linearly moved in a laser beam scanner, a hologram is rectangular in general outline so that the limited area may move along the length of the hologram during the linear movement. It is known to manufacture such a hologram by recording on a hologram recording medium, such as a photographic plate record, a number of interference fringes formed by interference of two coherent beams. Fringes of higher-order interference are recorded on both end portions of the hologram with fringes of lower-order interference recorded on a central portion.

A sophisticated hologram for use typically in a laser beam scanner, is manufactured by the use of a spherical-wave and a collimated beam. When the limited area covers that portion of the hologram on which higher-order interference fringes are recorded, aberrations become serious. The highest order of interference up to which it is possible to record the interference fringes for practical purposes, is therefore restricted. In other words, it has been impossible to manufacture a long hologram for practical applications and to widen the limited area. Furthermore, it has been necessary for practical uses to restrict the angle of deflection of the diffracted beam only to a few degrees in angle on either side of the axis of illumination.

Wai-Hon Lee proposed a phase plate for correcting the aberrations. The proposal is contributed to "Applied Optics," Volume 16, No. 5 (May 1977), pages 1392-1399, under the title of "Holographic Grating Scanners with Aberration Corrections." The phase plate is necessary only during manufacture of the holograms. It is, however, not so easy to manufacture the phase plate with a precision high enough to carry out the aberration corrections to a satisfactory extent.

An improved hologram is revealed in U.S. patent application Ser. No. 9,720 now U.S. Pat. No. 4,299,437, filed Feb. 5, 1979, by Yuzo Ono, the present applicant and assignor to the instant assignee. It is possible for the improved hologram to raise the highest order of interference to four times that for a sophisticated hologram and thereby to provide a hologram about twice as long as the sophisticated hologram. The improved hologram is, however, still insufficient in aberration corrections. It has been objectionable to raise the factor of magnification M up to four or more. The improved hologram is therefore inadequate for use in an image recorder where it is necessary to make the light spot scan a long line with the dimension of the spot strictly restricted.

SUMMARY OF THE INVENTION

It is therefore an object of the present invention to provide a novel hologram, which has sufficiently corrected aberrations.

It is another object of this invention to provide a hologram of the type described, for which the highest order of interference is raised up to nine times or more as compared with that for a sophisticated hologram.

It is still another object of this invention to provide a hologram of the type described, which is about three times or more as long as the sophisticated hologram.

It is yet another object of this invention to provide a hologram of the type described, which can be used in a coherent beam scanner with the factor of magnification raised nearly up to nine and, as the case may be, nearly up to sixteen.

It is a further object of this invention to provide a method of manufacturing a hologram of the type described.

It is a still further object of this invention to provide a coherent beam scanner, by which it is possible to correct the aberrations even when the scanner is used in combination with a hologram of the type disclosed in the above-referenced United States patent application.

It is a yet further object of this invention to provide a coherent beam scanner of the type described, for which it is possible to raise the factor of magnification without substituting a hologram for another hologram having less corrected aberrations.

According to this invention, there is provided a hologram comprising a hologram recording medium having a principal surface on which interference fringes are recorded in accordance with a phase distribution $\phi_N$ defined by:

$$\phi_N = 2\pi \left[ \sum_{k=1}^{N} ([r^2 + f_k^2]^{\frac{1}{2}} - f_k) \right] / \lambda$$

wherein N represents an integer greater than two; r, a distance on the principal surface between a predetermined point and an optional point; λ, a wavelength common to the coherent beams used to form the interference fringes; and $$\sum_{k=1}^{N} 1/f_k,$$

the focal power, namely, the reciprocal of the focal length, of the hologram for a coherent beam of the wavelength λ.

According to this invention, there is also provided a method of manufacturing a hologram by recording interference fringes on a principal surface of a hologram recording medium, wherein the interference fringes are formed by making a spherical-wave interfere with a phase subtract aspheric-wave beam given by phase subtraction of a plurality of coherent spherical-waves.

According to this invention, there is also provided a method of manufacturing a hologram by recording interference fringes on a principal surface of a hologram recording medium, wherein the interference fringes are formed by making a first phase subtract aspheric-wave given by phase subtraction of a plurality of coherent spherical-waves interfere with a second phase subtract aspheric-wave given by phase subtraction of a plurality of coherent spherical-waves.

A coherent beam scanner according to this invention comprises a source of a coherent beam having a coherent beam axis and means for carrying at least one hologram and for moving the carried hologram relative to the coherent beam axis, wherein the hologram comprises a hologram recording medium having a principal surface on which interference fringes are recorded in accordance with a phase distribution $\phi_N$ defined by:

$$\phi_N = 2\pi \left[ \sum_{k=1}^{N} ([r^2 + f_k^2]^{\frac{1}{2}} - f_k) \right] /\lambda,$$

where N represents an integer greater than two; r, a distance on the principal surface between a predetermined point and an optional point; λ, a wavelength common to coherent beams used to form the interference frings; and $$\sum_{k=1}^{N} 1/f_k,$$

the focal power of the hologram for a coherent beam of the wavelength λ.

According to this invention, there is furthermore provided a coherent beam scanner for use in combination with at least one hologram manufactured by the use of a plurality of coherent spherical-waves of a common wavelength. The coherent beam scanner comprises a source of a coherent illuminating beam having an axis of illumination and means for carrying the hologram and for moving the carried hologram relative to the axis of illumination, wherein the coherent illuminating beam has a wavelength longer than the common wavelength.

BRIEF DESCRIPTION OF THE DRAWING

FIG. 5 is a schematic side view of a coherent beam scanner according to an embodiment of this invention;

FIG. 6 is a schematic perspective view of a coherent beam scanner according to another embodiment of this invention;

FIG. 7 is a schematic top view of an optical system used in either of the coherent beam scanners shown in FIGS. 5 and 6;

FIG. 8 shows a characteristic of a sophisticated hologram;

FIGS. 9(a), 9(i b), and 9(c) show characteristics of several conventional holograms;

FIGS. 10(a), 10(b), and 10(c) show characteristics of several holograms according to the embodiment illustrated in conjunction with FIGS. 1 and 4;

DESCRIPTION OF THE PREFERRED EMBODIMENTS

Figure 1:
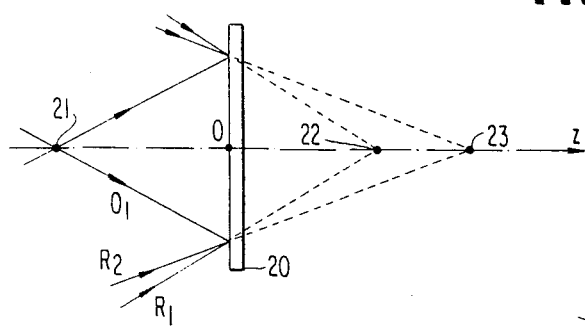
FIG. 1 schematically shows an optical system for use in manufacturing a hologram according to an embodiment of the instant invention.

A theoretical hologram for use in a laser beam scanner will be described at first in order to facilitate an understanding of the present invention. The hologram has a pattern of a large number of generally arcuate interference fringes on a surface of a hologram recording medium as, for example, a photographic plate. When orthogonal x and y coordinate axes are considered on the surface, the interference fringes should have, for a laser beam of a predetermined wavelength λ, a phase distribution that follows a theoretical phase function $\phi_0(x, y)$ such that:

$$\phi_0(x, y) = \pi r^2/(\lambda F). \tag{1}$$

where $r^2$ represents $(x^2 + y^2)$ and F, a focal length of the hologram for the predetermined wavelength λ. On the surface of the hologram, n-th order interference fringes are in the form of arcs or circles where the theoretical phase function $\phi_0(x, y)$ is equal to $2n\pi$ (n = 1, 2, 3, ...). According to Equation (1), radii $r_{n0}$ of the n-th interference fringes are given by:

$$r_{n0} = [2\lambda Fn]^{\frac{1}{2}}. \tag{2}$$

A sophisticated hologram, known as a point-source hologram, is manufactured by subjecting a hologram recording medium to a divergent spherical-wave and a plane-wave or collimated beam that is coherent with the divergent beam. The theoretical phase function $\phi_0$ is thereby approximated as:

$$\phi_1(x, y) = 2\pi([r^2 + F^2]^{\frac{1}{2}} - F)/\lambda, \tag{3}$$

in which a phase function $\phi_1(x, y)$ will herein be referred to as a first-rank phase function for the reason that will become clear as the description proceeds. According to Equation (3), radii $r_{n1}$ of the n-th order interference fringes are given by:

$$r_{n1} = [2\lambda Fn + (n\lambda)^2]^{\frac{1}{2}}. \tag{4}$$

It is understood from Equations (2) and (4) that the sophisticated hologram may be used in place of the theoretical hologram when the order of interference n satisfies:

$$F >> n\lambda/2, \quad (5)$$

which inequality shows that aberrations become serious as the sophisticated hologram is linearly moved in a laser beam scanner relative to the axis of a hologram illuminating beam to produce a diffracted beam from that portion of the hologram on which higher-order interference fringes are recorded. As a result of the aberrations, a light spot formed by the diffracted beam is elongated in the direction of scan to deteriorate the resolution.

This has rendered it impossible to provide a sophisticated hologram of a long length and to make the light spot scan a long line of scan.

A hologram disclosed in U.S. patent application Ser. No. 9,720 now U.S. Pat. No. 4,299,437, referred to hereinabove, is manufactured by making a divergent spherical-wave interfere on a surface of a hologram recording medium with a convergent spherical-wave that is coherent with the divergent beam and would converge at a point on the other side of the surface with respect to a point of divergence of the divergent beam. In a laser beam scanner, the conventional hologram revealed in the referenced United States patent application may be illuminated by whichever of a convergent, a divergent, and a collimated beam.

A phase distribution of the interference fringes recorded on the conventional hologram follows a phase function $\phi_2(x, y)$ such that:

$$\phi_2(x, y) = 2\pi([r^2 + f_1^2]^{\frac{1}{2}} - f_1 + [r^2 + f_2^2]^{\frac{1}{2}} - f_2)/\lambda, \quad (6)$$

where $f_1$ and $f_2$ represent the distances between the surface of the hologram recording medium and the points of divergence and convergence, respectively. Equation (6) will herein be referred to as a second-rank phase function. The focal length F of the conventional hologram is given by:

$$1/F = 1/f_1 + 1/f_2.$$

The second-rank phase function $\phi_2(x, y)$ given in Equation (6) is equivalent to the theoretical phase function $\phi_0(x, y)$ defined by Equation (1) when:

$$F >> n\lambda/8, \quad (7)$$

which inequality shows that an equal degree of aberrations is insured even when the order of interference n is four times as great as the order of interference n conditioned by Inequality (5). In other words, the aberrations resulting from the conventional hologram do not reach those of the sophisticated hologram until the radius or diameter of the conventional hologram becomes about twice as long as that of the sophisticated one.

Referring now to FIG. 1, the principles will be described at first, based on which a phase subtract divergent aspheric-wave is produced for use in manufacturing a novel hologram by a method according to an aspect of this invention in cooperation with a convergent spherical-wave coherent with the phase subtract divergent beam. An optical system being exemplified in plan comprises a hologram recording medium 20 having a pair of principal surfaces. As described hereinabove, orthogonal x and y coordinate axes (not shown) are considered on a predetermined one of the principal surfaces. When a photographic plate or film is used as the hologram recording medium, the film of photosensitive emulsion serves as the predetermined principal surface. A z coordinate axis is perpendicular to the predetermined principal surface at a predetermined point, which serves as a point of origin O. The positive sense of the z axis is directed from the predetermined principal surface to the other. It is possible to understand without loss of generality that the x axis runs along the plane of the figure and the y axis, perpendicular thereto.

Let first through third spherical-waves have their respective beam axes coincident with the z axis merely for simplicity of description. The first beam serves as a first objective or illuminating beam $O_1$ that once converges at a first point 21 on the negative part of the z axis and thence diverges to be incident on the predetermined principal surface as a divergent spherical-wave. The second beam serves as a first reference beam $R_1$ coherent with the first beam and incident on the predetermined principal surface as a convergent spherical-wave that would converge at a second point 22 on the positive part of the z axis. The third beam will presently be described.

At an optional point (r, z) in the x-y-z coordinate space, where $r^2 = x^2 + y^2$, phases $O_1(r, z)$ and $R_1(r, z)$ of the first objective and the first reference beams $O_1$ and $R_1$ are given by:

$$O_1(r, z) = \exp[-iK([r^2 + (z - z_O)^2]^{\frac{1}{2}} + z_O)] \quad (8)$$

and $$R_1(r, z) = \exp[iK([r^2 + (z - z_R)^2]^{\frac{1}{2}} - z_R)],$$

where $K = 2\pi/\lambda$ and $z_O$ and $z_R$ represent the z coordinates of the first and the second points 21 and 22, respectively. When the point (r, z) is on the predetermined principal surface where $z = 0$, the phases $O_1(r)$ and $R_1(r)$ are:

$$O_1(r) = \exp[-iK([r^2 + f_1^2]^{1/2} - f_1)]$$

and $$R_1(r) = \exp[iK([r^2 + f_2^2]^{\frac{1}{2}} - f_2)],$$

where $f_1 = -z_O$ and $f_2 = z_R$. Interference fringes $H_1(r)$ recorded on the predetermined principal surface are defined by:

$$H_1(r) = O_1(r) \cdot R_1(r)^* + O_1(r)^* \cdot R_1(r), \quad (9)$$

where the symbol * represents the conjugate complex. Namely:

$$H_1(r) = \exp[-iK([r^2 + f_1^2]^{\frac{1}{2}} - f_1 + [r^2 + f_2^2]^{\frac{1}{2}} - f_2)] + \quad (10)$$
$$\exp[iK([r^2 + f_1^2]^{\frac{1}{2}} - f_1 + [r^2 + f_2^2]^{\frac{1}{2}} - f_2)],$$

or:

$$H_1(r) = 2\cos[K([r^2 + f_1^2]^{\frac{1}{2}} - f_1 + [r^2 + f_2^2]^{\frac{1}{2}} - f_2)].$$

A hologram thus manufactured is a conventional hologram, as called in the instant specification. From the viewpoint of this invention, the hologram serves as a hologram partially manufactured to a first stage and will be named a first-stage hologram 20 (the same reference numeral being used merely for simplicity of illustration).

Let a collimated beam (not shown) having a beam axis parallel to the z axis illuminate the first-stage hologram 20 as an illuminating beam. At any point (r, z) in the x-y-z coordinate space, the collimated beam has a phase defined by $\exp[-iKz]$. A first diffracted beam $W_1$ thereby produced (not shown) has a phase $W_1(r, z)$ given by:

$$W_1(r, z) = \exp[-iKz] \cdot H_1(r), \qquad (11)$$

or:

$$W_1(r, z) = \exp[-iK([r^2 + f_1^2]^{\frac{1}{2}} - f_1 + [r^2 + f_2^2]^{\frac{1}{2}} - f_2 + z)] +$$
$$\exp[iK([r^2 + f_1^2]^{\frac{1}{2}} - f_1 + [r^2 + f_2^2]^{\frac{1}{2}} - f_2 - z)].$$

In the righthand side of Equation (11), the first and the second terms represent divergent and convergent aspheric-waves, respectively. When Equation (11) is compared with Equations (8), it is seen that the phase of each of the divergent and the convergent aspheric-waves is equivalent to a phase difference resulting from phase subtraction of two spherical-waves used in manufacturing the first-stage hologram 20. Such a beam is herein called a phase subtract beam. The relation between the phases is obvious also from Equation (9) representative of the interference fringes in general.

The divergent aspheric-wave defined by the first term is for use as a second objective beam $O_2$ in manufacturing a hologram according to a first embodiment of this invention. As will later be described, it is possible to use a hologram according to the first embodiment of this invention in manufacturing a hologram according to any one of various other embodiments of this invention. Means for separating the second objective $O_2$ from the convergent aspheric-wave beam defined by the second term will be described later. The means serves also in separating the second objective beam $O_2$ from other beams that will shortly be described. The third spherical-wave is for use as a second reference beam $R_2$ coherent with the collimated beam and incident on the predetermined principal surface as a convergent spherical-wave that would converge at a third point 23 on the positive part of the z axis. On the predetermined principal surface, the second objective and the second reference beams $O_2$ and $R_2$ have phases $O_2(r)$ and $R_2(r)$ represented by:

$$O_2(r) = \exp[-iK([r^2 + f_1^2]^{\frac{1}{2}} - f_1 + [r^2 + f_2^2]^{\frac{1}{2}} - f_2)]$$

and $$R_2(r) = \exp[iK([r^2 + f_3^2]^{\frac{1}{2}} - f_3)],$$

where $f_3$ represents the distance between the predetermined principal surface and the third point 23. As by Equation (9), interference fringes $H_2(r)$ resulting from the interference between the second objective and the second reference beams $O_2$ and $R_2$ are:

$$H_2(r) = \exp[-iK([r^2 + f_1^2]^{\frac{1}{2}} - f_1 + [r^2 + f_2^2]^{\frac{1}{2}} - f_2 +$$
$$[r^2 + f_3^2]^{\frac{1}{2}} - f_3)] + \exp[iK([r^2 + f_1^2]^{\frac{1}{2}} - f_1 +$$
$$[r^2 + f_2^2]^{\frac{1}{2}} - f_2 + [r^2 + f_3^2]^{\frac{1}{2}} - f_3)],$$

or:

$$H_2(r) = 2\cos\left[K \cdot \sum_{k=1}^{3} ([r^2 + f_k^2]^{\frac{1}{2}} - f_k)\right].$$

The phase distribution of the interference fringes $H_2(r)$ formed on the predetermined principal surface is given by:

$$\phi_3(x, y) = K \cdot \sum_{k=1}^{3} ([r^2 + f_k^2]^{\frac{1}{2}} - f_k), \qquad (12)$$

in which the function $\phi_3(x, y)$ will be referred to as a third-rank phase function. The hologram thereby manufactured is a novel hologram according to the first embodiment of this invention. The method thus far described may be said to be a method of manufacturing a hologram by recording interference fringes on a principal surface of a hologram recording medium in compliance with a phase distribution defined by Equation (12).

Figure 2:
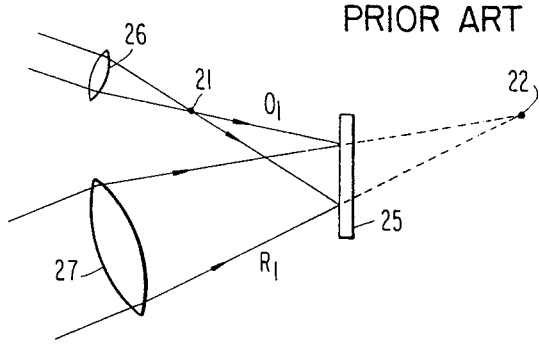
FIG. 2 is a schematic side view of an optical system for manufacturing a first-stage hologram for use in manufacturing a hologram according to this invention.

Turning to FIG. 2, an optical system for manufacturing a first-stage hologram 25 for use in manufacturing a hologram according to this invention as described above, is schematically depicted as seen from a side. The optical system comprises a hologram recording medium 25 (the same reference numeral being used again for simplicity of illustration). It may be mentioned here that a hologram for use in a laser beam scanner is generally rectangular in outline and is linearly moved relative to a source of a laser beam used in illuminating the hologram. A beam directly transmitted through the hologram with zeroth-order diffraction rather than with first-order or higher-order diffraction, is therefore eliminated when the laser beam produced by the source is caused to illuminate the hologram with an axis of illumination inclined widthwise of the hologram from a normal to the predetermined principal surface. The first-stage hologram 25 is therefore manufactured with the beam axes of the first and the second spherical-wave beams made to form a predetermined acute angle therebetween rather than aligned as described with reference to FIG. 1. The beam axes should be in a plane normal to the predetermined principal surface and to the length of the hologram recording medium 25. The first and the second points 21 and 22 should be on a normal to the predetermined principal surface.

In FIG. 2, a beam from a laser (not shown) is split into two beams by a beam splitter (not shown). One of the beams is made once to converge at the first point 21 by a first optical system 26 and thence to be incident on the predetermined principal surface as a divergent spherical-wave that serves as the first objective beam $O_1$. The other of the split beams is expanded by a beam expander (not shown) and caused to be incident on the predetermined principal surface through a second optical system 27 as a convergent spherical-wave that serves as the first reference beam $R_1$ and would converge at the second point 22. Interference fringes $H_1(r)$ are recorded on the predetermined principal surface according to Equation (10). The first-stage hologram 25 is obtained by developing and otherwise disposing of the record.

Figure 3:
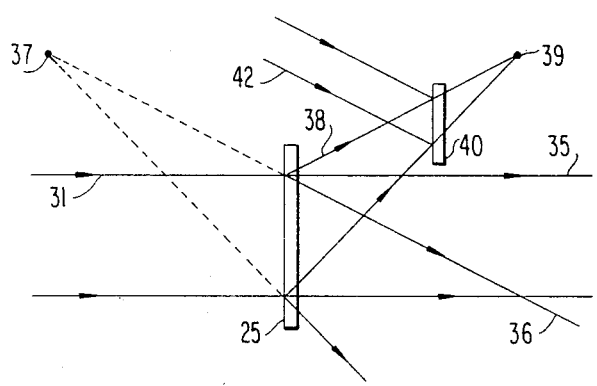
FIG. 3 is a diagrammatic side view of an optical system for manufacturing an auxiliary hologram for use in manufacturing a hologram according to this invention.

Turning further to FIG. 3, the first-stage hologram 25 is illuminated by a first collimated beam 31 of the wavelength equal to the common wavelength of the beams split into two by the beam splitter described in conjunction with FIG. 2. The hologram 25 produces a zeroth-order diffracted and directly transmitted beam 35, a divergent aspheric-wave 36 divergent from an imaginary point 37, and a convergent aspheric-wave 38 convergent at an actual point 39. The aspheric-waves 36 and 38 are those given by the first and the second terms in the righthand side of Equation (11). It would be possible to manufacture a hologram according to the first embodiment of this invention if it were possible to make only the divergent aspheric-wave beam 36 interfere with the third spherical-wave $R_2$ (not shown) on the predetermined principal surface. The fact is that this is infeasible because not only the directly transmitted beam 35 and the other aspheric-wave 38 but also higher-order diffracted beams (not shown) are coexistent on the predetermined principal surface in superposition on the divergent aspheric-wave 36 and are recorded as spurious interference fringes.

A second hologram recording medium 40 is therefore used to separate the divergent aspheric-wave 36 from the other beams. The second hologram recording medium 40 is placed at a position where only the convergent aspheric-wave 38 is present. A second collimated beam 42 coherent with the convergent aspheric-wave 38 is caused to illuminate the predetermined principal surface of the second hologram recording medium 40. An auxiliary hologram 40 (the same reference numeral being used) is thereby manufactured.

Figure 4:
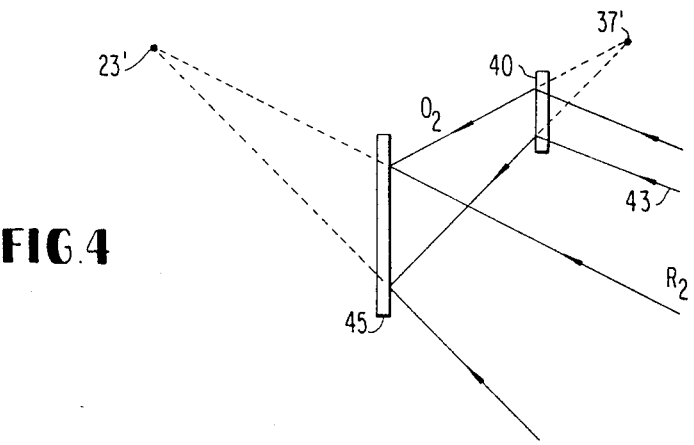
FIG. 4 is a diagrammatic side view of an optical system for manufacturing a hologram illustrated in FIG. 1.

Referring to FIG. 4, the auxiliary hologram 40 is illuminated by a third collimated beam 43 of the wavelength equal to the common wavelength of the first and the second spherical-waves $O_1$ and $R_1$ from the other side of the predetermined principal surface. The auxiliary hologram 40 produces, among others, a reproduction of the divergent aspheric-wave 36 (FIG. 3). The reproduction, divergent from an imaginary point 37' corresponding to the imaginary point 37 (FIG. 3), is used as the second objective beam $O_2$ and is caused to be incident on the predetermined principal surface of a third hologram recording medium 45. A convergent spherical-wave that serves as the second reference beam $R_2$ coherent with the second objective beam $O_2$ and would converge at a point 23' corresponding to the third point 23 (FIG. 1 among others) is also caused to be incident on the predetermined principal surface. It is thus possible to manufacture a hologram according to the first embodiment of this invention.

Reverting to Equation (11), it is possible to use the convergent aspheric-wave in combination with a divergent spherical-wave coherent therewith in manufacturing a hologram according to a second embodiment of this invention.

When illuminated by a collimated beam, a hologram according to either of the first and the second embodiments of this invention produces a combination of divergent and convergent aspheric-waves as described in connection with Equation (11). It is therefore possible to use such a hologram as a second-stage hologram in manufacturing a hologram according to a further embodiment of this invention. Repeating such processes, it is also possible to manufacture a hologram according to this invention, which comprises a hologram recording medium having a principal surface on which interference fringes are recorded in compliance with a phase distribution defined generally by:

$$\phi_N(x, y) = 2\pi \left[ \sum_{k=1}^{N} ([r^2 + f_k^2]^{\frac{1}{2}} - f_k) \right] / \lambda, \quad (13)$$

where N represents an integer greater than two and $f_k$, a distance between the principal surface and each of points, such as 21, 22, and 23 (FIG. 1), of convergence and divergence of the spherical-waves, such as the first through the third beams, used in manufacturing the hologram. The integer N represents the number of the spherical-waves. It is now unnecessary that the number of the divergent spherical-waves be either equal to or greater or less only by one than the number of the convergent spherical-waves. In Equation (13), the function $\phi_N(x, y)$ may be called an N-th-rank phase function.

It is also possible to manufacture a hologram according to this invention by the use of a divergent and a convergent coherent aspheric-wave produced by successive phase subtraction of a plurality of coherent spherical-waves, $N_1$ in number, and a convergent and a divergent coherent aspheric-wave beam resulting from a plurality of coherent spherical-waves, $N_2$ in number, respectively. The numbers $N_1$ and $N_2$ may or may not be equal to each other. The phase distribution of the interference fringes recorded on such a hologram is defined also by the N-th-rank phase function $\phi_N(x, y)$, where the integer N is equal to a sum of the numbers $N_1$ and $N_2$.

Referring again to FIGS. 3 and 4, an auxiliary hologram 40 should be manufactured for a hologram according to the second embodiment of this invention by placing the hologram recording medium 40 at a position where only the divergent aspheric-wave 36 is present. The auxiliary hologram 40 should be illuminated by the third collimated beam 43 so as to produce a reproduction of the convergent aspheric-wave 38.

A hologram according to either of the first and the second embodiments of this invention is used as the second-stage hologram in combination with a pertinent one of convergent and divergent coherent spherical-wave on manufacturing a novel hologram where the integer N is rendered equal to four. It is also possible to manufacture such a hologram by the use of two second-stage holograms. It is now obvious that a hologram where the integre N is greater than four is manufactured by repeating such processes.

The focal length F of a hologram according to this invention for the wavelength $\lambda$ common to the spherical-wave beams, N in number, is given by:

$$1/F = \sum_{k=1}^{N} 1/f_k. \quad (14)$$

For convenience of further description, it is now assumed that the distances $f_k$'s are equal to one another. When the equal distance is denoted by $f_e$:

$$f_e = NF. \quad (14')$$

By putting Equation (14') into Equation (13):

$$\phi_N(x, y) = N K[r^2 + (NF)^2]^{\frac{1}{2}} - NF),$$

from which radii $r_{nN}$ of the n-th-order interference fringes having such a phase distribution is given by:

$$r_{nN} = [2\lambda F n + (\lambda n/N)^2]^{\frac{1}{2}}.$$

The N-th-rank phase function $\phi_N(x, y)$ therefore approximates the theoretical phase function $\phi_O(x, y)$ when $$F >> \lambda n/(2N^2). \quad (15)$$

This shows that the N-th-rank phase function $\phi_N(x, y)$ gives quite an excellent approximation as compared with the first-rank and the second-rank phase functions $\phi_1(x, y)$ and $\phi_2(x, y)$. Stated otherwise, it is possible to suppress the aberrations of a hologram according to this invention to a remarkable extent.

For example:

$$F >> \lambda n/18, \quad (15')$$

even when the integer N is equal to only three. Comparison of Inequality (15') with Inequality (7) for the conventional hologram shows than an equal degree of approximation to the theoretical phase function $\phi_0(x, y)$ is insured with a novel hologram according to either of the first and the second embodiments of this invention up to an interference fringe where the highest order of interference n is 9/4 times as high as that for the conventional hologram. The abberrations are suppressed to the same degree with a novel hologram, which is about 3/2 times as long as the conventional hologram.

Referring now to FIGS. 5 and 6, a laser beam scanner is for use in combination with at least one hologram 51, which may or may not be a hologram according to this invention. As illustrated in FIG. 6, the hologram 51 is rectangular in general outline. In FIG. 5, it should be understood that the hologram 51 is movable by means not shown in the direction perpendicular to the plane of the figure. In FIG. 6, a plurality of equivalent holograms, such as 51, are held by a rotary disk 52 rotatable about an axis 53. In any event, the laser beam scanner comprises a laser 55 and an optical system 56 for generating a laser beam for use as an illuminating laser beam directed to a limited area of the hologram 51 along an axis of illumination. In the examples being illustrated, the illuminating beam is a spherical-wave divergent from a point of divergence 57.

The illuminating laser beam is diffracted by the hologram 51 so that a first-order diffracted beam will form a light spot or scan spot 58 on an output plane 59. As the hologram 51 is linearly moved in FIG. 5 lengthwise thereof relative to the axis of illumination, the light spot 58 scans the output plane 59 along a straight line perpendicular to the plane of the Figure. As the light spot 58 scans the output plane 59 along a little bowed line illustrated in FIG. 6, the hologram 51 is circularly moved about an axis 53 by a rotation of disk 52 in FIG. 6. The linear movement of the hologram 51 may be achieved also by attaching the hologram 51 to a rotatable drum (not shown) having an axis of rotation parallel to the output plane 59.

Turning to FIG. 7, the laser beam scanner will be reviewed as regards the image formation. It is assumed that the x axis is parallel to the length of the hologram 51, which is now situated during the lengthwise movement at a position such that the axis of illumination intersects the predetermined principal surface at a point of intersection (x, O), which point is not depicted for clarity of illustration. Two points $(x+\Delta x, O)$ and $(x-\Delta x, O)$ equally spaced by an increment $\Delta x$ from the point of intersection (x, O) are included in the limited area illuminated by the illuminating laser beam. Let the point of divergence 57 be spaced from the predetermined principal surface by an object distance a and the light spot 58, by an image distance b(x). For simplicity of description, attention will be directed only to the first-order diffraction in the direction of the x axis so that the abscissa x of an optional point on the x axis may be represented by the distance r of the point from the origin O. The factor of magnification M described hereinabove is now defined by:

$$M = b(O)/F.$$

The image distance b(x) is given by:

$$b(x) = 2\Delta x/[\tan \beta(x+\Delta x) - \tan \beta(x-\Delta x)], \quad (16)$$

where $\beta(x \pm \Delta x)$ represent angles of deflection formed by two lines of beams diffracted at the two points $(x \pm \Delta x)$ with a normal to the predetermined principal surface. On the other hand, equations:

$$\sin\beta(x \pm \Delta x) = \sin(\text{Tan}^{-1}[\pm \Delta x/a]) - (1/k) \cdot [\partial \phi_N(r)/\partial r]_{k=x\pm\Delta x} \quad (17)$$

(double sign in the same order)

are obtained from the relation between the angles of diffraction for a diffraction grating in general. Equations (17) hold also for either of the first-rank and the second-rank phase functions $\phi_1(x, y)$ and $\phi_2(x, y)$ used in the known holograms and described in connection with Equations (3) and (6). It is possible from Equations (16) and (17) to express the image distance b(x) in terms of an angle of deflection $\beta(x)$ that is formed between the axis of illumination and the line of beam diffracted at the point of intersection (x, O).

FIGS. 8 through 11 are illustrative of relations between the image distance b(x) versus the angle of deflection $\beta(x)$ for various holograms and for various factors of magnification M's. The focal lengths of all holograms are rendered equal to 100 mm. The light spot 58 (FIGS. 5 through 7) is adjusted to be 100 microns in radius. For brevity of description, each distance $f_k$ between the predetermined principal surface and the point of divergence or convergence of the spherical-wave used in manufacturing the holograms will be referred to as a focal length $f_1$, $f_2$, $f_3$, or the like.

FIG. 8 shows the relation for a sophisticated hologram with the factor of magnification M set at five. The light spot is seriously deformed with an increase in the angle of deflection $\beta(x)$ as a result of a rapid increase of the image distance b(x). It is possible to use the hologram only when the angle of deflection $\beta(x)$ is within only a few degrees in angle on either side of the axis of illumination.

FIG. 9(a) shows the relation for several conventional holograms with the factor of magnification M set as small at as three. From the top to the bottom, the curves are for the holograms where the focal lengths $f_1$'s or $f_2$'s are 300 mm, 285 mm, 275 mm, 250 mm, and 200 mm, respectively. It is seen that the image distance b(x) is kept approximately constant for as great an angle of deflection $\beta(x)$ as 40° on either side of the axis of illumination only when the focal length $f_1$ or $f_2$ is between 285 mm and 275 mm.

FIG. 9(b) shows the relations also for several conventional holograms with four selected as the factor of magnification M. The curves are, from the top to the bottom, for the holograms where the focal lengths $f_1$'s or $f_2$'s are 300 mm, 250 mm, and 200 mm, respectively. It is possible to keep the image distance $b(x)$ approximately constant within an angle of deflection $\beta(x)$ less than about 20° on either side of the axis of illumination when a value between 250 mm and 200 mm is selected as the focal length $f_1$ or $f_2$. The length of scan becomes considerably short as compared with the case where three is selected as the factor of magnification M despite an increase in the factor M from three to four.

FIG. 9(c) shows the relation for a conventional hologram with the factor of magnification M set at five as in the case depicted in FIG. 8 for a sophisticated hologram. Each of the first and the second focal lengths $f_1$ and $f_2$ is rendered equal to 200 mm. It is possible to keep the image distance $b(x)$ nearly constant only when the angle of deflection $\beta(x)$ is within about 15° on either side of the axis of illumination. The line of scan is not lengthened as compared with the case where four is selected as the factor of magnification M.

Reviewing FIGS. 9(a), 9(b), and 9(c), it is understood that the light spot is not seriously deformed for a remarkably wide angle of deflection $\beta(x)$ when the conventional hologram is used with the factor of magnification M restricted to less than four.

FIGS. 10(a), 10(b), and 10(c) show the relations for several holograms manufactured according to this invention with the phase distribution of the interference fringes defined in accordance with the third-rank phase function $\phi_3(x, y)$ given in Equation (12). Among the three focal lengths $f_1$, $f_2$, and $f_3$, the first and the second focal lengths $f_1$ and $f_2$ are rendered equal to each other. The third focal length $f_3$ will readily be calculated from Equation (14) if necessary.

FIG. 10(a) is illustrative of a case where the factor of magnification M is set as great at as six. From the top to the bottom, the curves are for the holograms where the first focal lengths $f_1$'s are 420 mm, 410 mm, 400 mm, 390 mm, and 300 mm, respectively. When 400 mm is selected as the first focal length $f_1$, the image distance $b(x)$ is kept approximately constant for as great an angle of deflection $\beta(x)$ as 40° on either side of the axis of illumination. The length of scan is remarkably lengthened because it is possible to use a long hologram and a great factor of magnification M.

FIG. 10(b) is depicted for the case where eight is selected as the factor of magnification M. The curves are, from the top to the bottom, for the holograms where the first focal lengths $f_1$'s are 350 mm, 340 mm, 330 mm, 320 mm, 310 mm, and 300 mm, respectively. When 320 mm is used as the first focal length $f_1$, the image distance $b(x)$ varies from 800 mm only up to 810 mm and down to 787.5 mm even when the angle of deflection $\beta(x)$ may vary 40° on either side of the axis of illumination. With the factor of magnification M given as great a value as eight, the line of scan is further lengthened.

FIG. 10(c) shows the case where the factor of magnification M is increased to nine. The first focal length $f_1$ is given a value of 300 mm. The maximum angle of deflection $\beta(x)$ up to which the image distance $b(x)$ is kept approximately constant, is about 20°.

From FIGS. 10(a), 10(b), and 10(c), it is understood that a hologram according to either of the first and the second embodiments of this invention makes it possible to provide a very long line of scan when used with the factor of magnification M rendered less than nine.

Figure 11A:
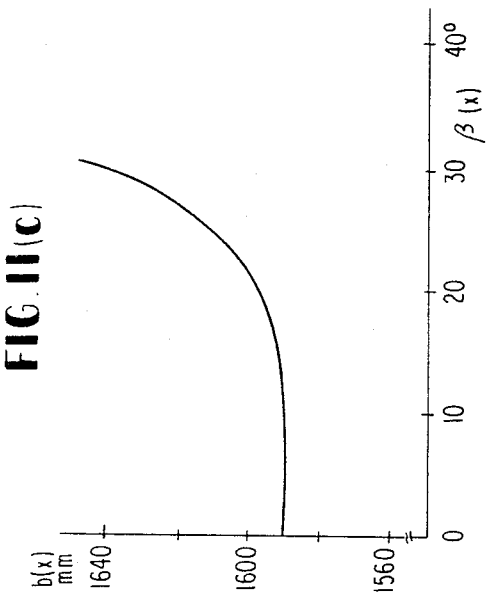
FIGS. 11(a), 11(b), and 11(c) show characteristics of several holograms according to another embodiment of this invention.
Figure 11C:
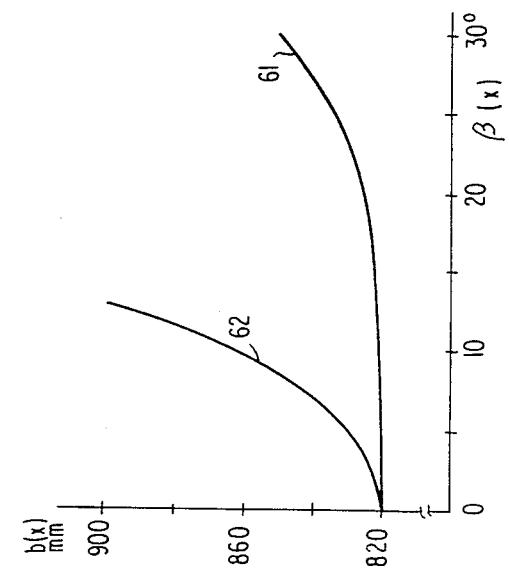
Figure 11B:
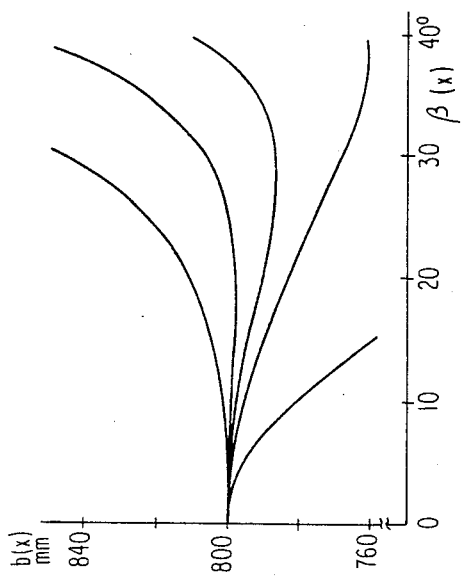

FIGS. 11(a), 11(b), and 11(c) are drawn for several holograms according to this invention where the integer N is given a value of four in the N-th-rank phase function $\phi_N(x, y)$. The first and the second focal lengths $f_1$ and $f_2$ are rendered equal to each other. The third and the fourth focal lengths $f_3$ and $f_4$ are also equal to each other. The third or the fourth focal length $f_3$ or $f_4$ will readily be calculated from the first focal lengths $f_1$'s given below if desired.

FIG. 11(a) illustrates the relation for a case where eight is selected as the factor of magnification M. From the top to the bottom, the curves are for the hologram where the first focal lengths $f_1$'s are equal to 1,000 mm, 900 mm, 850 mm, 800 mm, and 400 mm, respectively.

FIG. 11(b) is for the case where as great a value as twelve is selected as the factor of magnification M. The curves are for the holograms where the first focal lengths $f_1$'s are 600 mm, 580 mm, 560 mm, and 550 mm from the top to the bottom, respectively.

FIG. 11(c) is for the case where sixteen is selected as the factor of magnification M. The single curve is for a hologram where the first focal length $f_1$ is 400 mm. The maximum angle of deflection $\beta(x)$ up to which the image distance $b(x)$ is approximately constant, is about 20° on either side of the axis of illumination.

Reviewing now FIGS. 9 through 11, it is clear that aberrations are corrected for the conventional holograms as well as for the holograms according to this invention when the factor of magnification M is kept less than $N^2$. As compared with the conventional ones, a hologram according to this invention makes it possible to use an obviously great factor of magnification M and thereby to quite remarkably lengthen the line of scan. Too great a number N of rank is, however, undesirable because a hologram according to this invention is thereby degraded as a result of noises unavoidably resulting from the gain sizes and from recording nonlinearities in the photosensitive emulsion. Insofar as the present techniques of the related technical fields, such as the technology of photography, are concerned, either three or four should be selected as the integer N for the practical purposes. The resultant deflection angle and scan length are large enough for practical use.

Referring far back to Inequalities (8), (15), and (15'), let the focal length F of either a conventional hologram or a novel hologram according to this invention and the wavelength $\lambda$ common to the spherical-waves used in manufacturing such a hologram be rewritten by $F_1$ and $\lambda_1$. Inequality (15), valid also for the conventional hologram, becomes:

$$F_1 >> \lambda_1 n/(2N^2). \qquad (18)$$

The hologram has a shorter focal length $F_2$ for a coherent beam of a longer wavelength $\lambda_2$. The relation is:

$$F_2 = F_1 \times \lambda_1/\lambda_2. \qquad (19)$$

When the hologram is illuminated even by a coherent collimated or a coherent converging spherical-wave of the longer wavelength $\lambda_2$ in a laser beam scanner, such as that illustrated with reference to either of FIGS. 5 and 6, Inequality (18) becomes, when rewritten by the use of Equation (19):

$$F_2 >> \lambda_2 n(\lambda_1/\lambda_2)^2/(2N^2). \qquad (20)$$

A modified approximation condition given by Inequality (20) is better than the unmodified approximation condition (18) by a factor of $(\lambda_1/\lambda_2)^2$. The factor of magnification M becomes greater by a factor of $(\lambda_2/\lambda_1)^2$ with the geometrical configuration of the laser beam scanner kept as it is.

TABLE

| Example | $\lambda_1$ | $\lambda_2$ | Factor of Improvement |
|---------|-------------|-------------|----------------------|
| 1 | 4416 (He—Cd laser) | 6328 (He—Ne laser) | 2.05 |
| 2 | 4416 (He—Cd laser) | 8500 (GaAs laser) | 3.70 |
| 3 | 4880 (Ar ion laser) | 6328 (He—Ne laser) | 1.68 |
| 4 | 4880 (Ar ion laser) | 8500 (GaAs laser) | 3.03 |
| 5 | 6328 (He—Ne laser) | 8500 (GaAs laser) | 1.80 |

It is therefore preferred that a hologram used in a laser beam scanner be illuminated by a laser beam of a wavelength longer than the common wavelength of the coherent laser beams used in manufacturing the hologram. Examples of combinations of a common wavelength $\lambda_1$ of the laser beams used in manufacturing the hologram and a longer wavelength $\lambda_2$ of the illuminating laser beam are listed in Table given above. In the Table, the wavelengths $\lambda_1$ and $\lambda_2$ are given in ångström unit and the factor of improvement, by the value of $(\lambda_2/\lambda_1)^2$.

In addition to the remarkable technical merits of aberration corrections, Examples 1 through 4 are astonishingly excellent in that it is possible to manufacture a hologram by using a photoresist film as the predetermined principal surface of a hologram recording medium and thereby to raise the diffraction efficiency of the diffraction grating. In connection with the use of a coherent beam of a longer wavelength in illuminating in a coherent beam scanner a hologram manufactured by the use of coherent spherical-wave beams of a common wavelength shorter than the wavelength of the illuminating beam, it may be mentioned here that a photosensitive material is hardly available at present with a sufficient photosensitivity and an excellent resolution for near infrared rays, such as those generated by the GaAs laser. Use of laser beams of shorter wavelengths is desirable also in this respect because selection of photosensitive materials is thereby facilitated. Furthermore, the angle of diffraction becomes greater when the hologram is illuminated by a coherent beam of a longer wavelength. This makes it feasible to achieve a wider angle of deflection and a longer line of scan.

Figure 12:
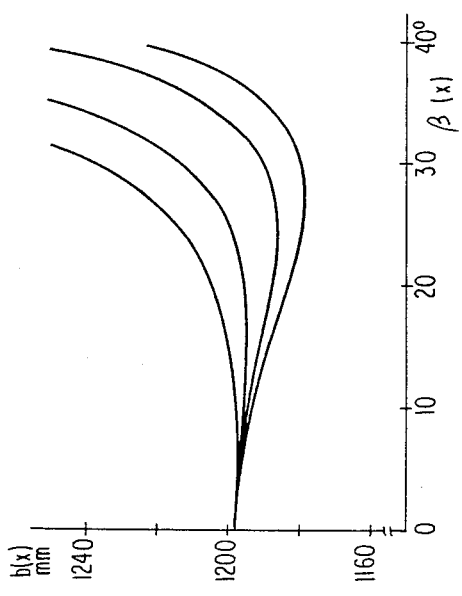
FIG. 12 shows a characteristic of a laser beam scanner depicted in either of FIGS. 5 and 6 in comparison with a characteristic of a conventional laser beam scanner.

Referring finally to FIG. 12, the image distance $b(x)$ is illustrated versus the angle of deflection $\beta(x)$. As is the case with FIGS. 8(a), 8(b), and 8(c), the hologram was manufactured by the use of only two coherent spherical-waves. The laser beam scanner was adjusted to provide the light spot with a radius of 100 microns. A first curve 61 is for a case where the hologram is manufactured by the use of a He-Cd laser beam (4416 Å) and is illuminated by a He-Ne laser beam (6328 Å) according to Example 1 given in Table 1. The focal length $F_1$ for the He-Cd laser beam is rendered equal to 100 mm. The focal length $F_2$ for the illuminating laser beam becomes equal to 100/2.05 mm. A second curve 62 is for a hologram manufactured by the use of the He-Ne laser beam and illuminated also by the He-Ne laser beam. The focal length F is set at 100 mm for the purpose of reference.

What is claimed is:

1. A hologram comprising a hologram recording medium having a principal surface on which interference fringes are recorded in accordance with a phase distribution $\phi_N$ defined by:

$$\phi_N = 2\pi \left[ \sum_{k=1}^{N} ([r^2 + f_k^2]^{\frac{1}{2}} - f_k) \right] / \lambda$$

where N represents an integer of three or more; r, a distance on said principal surface between a predetermined point and an optional point; $\lambda$, a wavelength common to the coherent beams used to form said interference fringes; and $f_K$ is the distance between the principal surface and the point of convergence or divergence of the particular wave.

2. A hologram as claimed in claim 1, wherein the integer N is equal to three.

3. A hologram as claimed in claim 1, wherein the integer N is equal to four.

4. A method of manufacturing a hologram by recording interference fringes on a principal surface of a hologram recording medium, said interference fringes being formed by making a spherical-wave interfere with a phase subtract aspheric-wave produced by phase subtraction of a plurality of coherent spherical-waves, N in number, where N represents an integer of two or more.

5. A method as claimed in claim 4, wherein the number N is equal to two.

6. A method as claimed in claim 4, wherein the number N is equal to three.

7. A method of manufacturing a hologram by recording interference fringes on a principal surface of a hologram recording medium, said interference fringes being formed by making a first phase subtract aspheric-wave produced by phase subtraction of a plurality of coherent spherical-waves, $N_1$ in number, interfere with a second phase subtract aspheric-wave produced by phase subtraction of a plurality of coherent spherical-waves, $N_2$ in number.

8. A method as claimed in claim 7, wherein each of the numbers $N_1$ and $N_2$ is equal to two.

9. A coherent beam scanner comprising a source of a coherent beam having a coherent beam axis and means for carrying at least one hologram and for moving the carried hologram relative to said coherent beam axis, said hologram comprising a hologram recording medium having a principal surface on which interference fringes are recorded in accordance with a phase distribution $\phi_N$ defined by:

$$\phi_N = 2\pi \left[ \sum_{k=1}^{N} ([r^2 + f_k^2]^{\frac{1}{2}} - f_k) \right] / \lambda$$

where N represents an integer of three or more; r, a distance on said principal surface between a predetermined point and an optional point; $\lambda$, a wavelength common to the coherent beams used to form said interference fringes; and to the coherent beams used to form said interference fringes; and $f_K$ is the distance between the principal surface and the point of convergence or divergence of the particular wave.

10. A coherent beam scanner as claimed in claim 9, wherein the integer N is equal to three.

11. A coherent beam scanner as claimed in claim 9, wherein the integer N is equal to four.

12. A coherent beam scanner for use in combination with at least one hologram having interference fringes in accordance with a phase distribution $\phi_N$ defined by:

$$\phi_N = 2\pi \left[ \sum_{k=1}^{N} ([r^2 + f_k^2]^{\frac{1}{2}} - f_k) \right] / \lambda$$

where:

N represents an integer of two or more, r a distance between a predetermined point and an optional point, $\lambda$ a wavelength common to the coherent beams used to form said interference fringes and $f_K$ is the distance between the principal surface and the point of convergence or divergence of the particular wave, said coherent beam scanner comprising a source of a coherent illuminating beam having an axis of illumination and means for carrying said at least one hologram and for moving the carried hologram relative to said axis of illumination, said coherent illuminating beam having a wavelength longer than said common wavelength.

* * * * *

UNITED STATES PATENT AND TRADEMARK OFFICE
CERTIFICATE OF CORRECTION

PATENT NO. : 4,378,142

DATED : March 29, 1983

INVENTOR(S) : Yuzo Ono

It is certified that error appears in the above-identified patent and that said Letters Patent is hereby corrected as shown below:

Col. 2, line 63, delete "the" before "coherent";

Col. 4, line 14, change "9(i b)" to --9(b)--;

line 36, change "x and y" to --$\underline{x}$ and $\underline{y}$--;

Col. 5, line 3, change "n" to --$\underline{n}$--;

line 18, change "This" to start on line 17 after "resolution";

line 54, change "n" to --$\underline{n}$--;

line 55, change "n" to --$\underline{n}$--;

Col. 6, line 2, change "x and y" to --$\underline{x}$ and $\underline{y}$--;

line 7, change "z" to --$\underline{z}$--;

line 10, change "z" to --$\underline{z}$--;

UNITED STATES PATENT AND TRADEMARK OFFICE
CERTIFICATE OF CORRECTION

PATENT NO. : 4,378,142

DATED : March 29, 1983

INVENTOR(S) : Yuzo Ono

It is certified that error appears in the above-identified patent and that said Letters Patent is hereby corrected as shown below:

Col. 6, line 12, change "x" to --$\underline{x}$--;

line 13, change "y" to --$\underline{y}$--;

line 16, change "z" to --$\underline{z}$--;

line 19, change "z" to --$\underline{z}$--;

line 26, change "z" to --$\underline{z}$--;

line 39, change "z" to --$\underline{z}$--;   (third occurrence)

line 45, change "$+f_1^2]^{178}$" to --$+f_1^2]^{1/2}$--.

Col. 7, line 7, change "z" to --$\underline{z}$--;

line 49, change "z" to --$\underline{z}$--;

Col. 8, line 45, change "in" to --on--;

UNITED STATES PATENT AND TRADEMARK OFFICE
CERTIFICATE OF CORRECTION

PATENT NO. : 4,378,142  Page 3 of 3

DATED : March 29, 1983

INVENTOR(S) : Yuzo Ono

It is certified that error appears in the above-identified patent and that said Letters Patent is hereby corrected as shown below:

Col. 8, line 51, delete "beams";

Col. 10, line 63, change "$NK[r^2+$" to --$NK([r^2+$--;

Col. 11, line 18, change "than" to --that--;

line 23, change "n" to --$\underline{n}$--;

line 24, change "abberrations" to --aberrations--;

line 59, change "x" to --$\underline{x}$--;

Col. 12, line 1, change "a" to --$\underline{a}$--;

line 4, change "x" to --$\underline{x}$--;

line 5, change "x" to --$\underline{x}$--;   (both occurs)

line 6, change "r" to --$\underline{r}$--.

Signed and Sealed this

Twentieth Day of September 1983

[SEAL]

Attest:

GERALD J. MOSSINGHOFF

Attesting Officer  Commissioner of Patents and Trademarks